United States Patent
Ramachandran

(10) Patent No.: US 9,603,182 B2
(45) Date of Patent: Mar. 21, 2017

(54) ESTABLISHING RELIABLE ALWAYS-ON PACKET DATA NETWORK CONNECTIONS

(71) Applicant: QUALCOMM Incorporated, San Diego, CA (US)

(72) Inventor: Shyamal Ramachandran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 210 days.

(21) Appl. No.: 14/207,282

(22) Filed: Mar. 12, 2014

(65) Prior Publication Data

US 2014/0269349 A1  Sep. 18, 2014

Related U.S. Application Data

(60) Provisional application No. 61/785,841, filed on Mar. 14, 2013.

(51) Int. Cl.
| | |
|---|---|
| *G01R 31/08* | (2006.01) |
| *H04W 76/02* | (2009.01) |
| *H04W 76/06* | (2009.01) |
| *H04W 68/00* | (2009.01) |

(52) U.S. Cl.
CPC ....... *H04W 76/028* (2013.01); *H04W 76/027* (2013.01); *H04W 76/064* (2013.01); *H04W 68/005* (2013.01); *H04W 76/022* (2013.01)

(58) Field of Classification Search
None
See application file for complete search history.

(56) References Cited

U.S. PATENT DOCUMENTS

| | | | |
|---|---|---|---|
| 2005/0165944 A1 | 7/2005 | Xue et al. | |
| 2007/0274233 A1* | 11/2007 | Ptashek | H04L 67/16 370/254 |
| 2009/0213784 A1 | 8/2009 | Ang | |
| 2010/0124223 A1* | 5/2010 | Gibbs et al. | 370/389 |

(Continued)

FOREIGN PATENT DOCUMENTS

WO    2011141154 A1    11/2011

OTHER PUBLICATIONS

3GPP: Technical Specification Group Core Network and Terminals; Study of EPC Nodes Restoration; (Release 11),3GPP Standard; 3GPP TR 23.857, 3rd Generation Partnership Project (3GPP), Mobile Competence Centre ; 650, Route Des Lucioles ; F-06921 Sophia-Antipolis Cedex ; France, vol. CT WG4, No. V2.1.0, Dec. 7, 2012, pp. 1-69, XP050690902.

(Continued)

*Primary Examiner* — Phirin Sam
(74) *Attorney, Agent, or Firm* — Arent Fox LLP

(57) ABSTRACT

A method, an apparatus, and a computer program product for wireless communication are provided. The apparatus, e.g., a network entity, may establish a connection between a user equipment (UE) and a packet data network, designate the packet data network with an always-on status, and notify the UE, while the UE is in the idle mode, when a loss of connection with the packet data network is detected. The UE may be connected to another packet data network when the loss of the connection occurs. A service provided by the packet data network may be designated as having an always-on status and the UE may be notified when a loss of the service is detected.

33 Claims, 13 Drawing Sheets

(56) References Cited

U.S. PATENT DOCUMENTS

| | | | |
|---|---|---|---|
| 2011/0176426 A1* | 7/2011 | Lioy | H04W 76/04 370/241 |
| 2012/0044867 A1 | 2/2012 | Faccin et al. | |
| 2012/0100848 A1 | 4/2012 | Miklos | |
| 2012/0250601 A1* | 10/2012 | Choi | H04W 88/04 370/315 |
| 2012/0252481 A1* | 10/2012 | Anpat | H04W 8/06 455/456.1 |
| 2012/0269167 A1* | 10/2012 | Velev | H04W 36/0011 370/331 |
| 2013/0163559 A1* | 6/2013 | Wang | 370/331 |
| 2013/0343309 A1* | 12/2013 | Mehta | 370/329 |
| 2014/0242962 A1* | 8/2014 | Choi et al. | 455/418 |
| 2014/0293958 A1* | 10/2014 | Teyeb | H04W 76/045 370/331 |
| 2015/0223284 A1* | 8/2015 | Jain | H04W 52/0258 370/329 |
| 2016/0212638 A1* | 7/2016 | Jain | H04W 52/0258 |

OTHER PUBLICATIONS

Celtic CP7-011: "Mobile Networks Evolution for Individual Communications Experience," Advanced EPC architecture for smart traffic steering, 2011, Version 1.2, pp. 1-63.
International Search Report and Written Opinion—PCT/US2014/026561—ISA/EPO—Sep. 25, 2014.

* cited by examiner

ESTABLISHING RELIABLE ALWAYS-ON PACKET DATA NETWORK CONNECTIONS

CROSS-REFERENCE TO RELATED APPLICATION(S)

This application claims the benefit of U.S. Provisional Application Ser. No. 61/785,841, entitled "Establishing Reliable Always-On PDN Connections" and filed on Mar. 14, 2013, which is expressly incorporated by reference herein in its entirety.

BACKGROUND

Field

The present disclosure relates generally to communication systems, and more particularly, to a wireless network in which user equipment connects to multiple packet data networks (PDNs).

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus may establish a connection between a user equipment (UE) and a packet data network (PDN), designate the PDN as having an always-on status, and notify the UE, while the UE is in an idle mode, when a loss of connection with the PDN is detected based on the always-on status.

The UE may be notified when the loss of connection with the PDN is detected by paging upon detecting the loss of the connection with the PDN. The UE may be connected to at least one other PDN when the UE is notified of the loss of the connection.

The UE may be notified when a loss of connection with the PDN is detected after a delay based on a predefined time interval. The predefined time interval may be calculated based on a time required to attempt reconnection of the PDN. The predefined time interval may be determined by the PDN. The predefined time interval may be provided by the PDN prior to disconnection of the PDN.

In an aspect of the disclosure, the apparatus may designate a service provided by the PDN as having an always-on status and notify the UE when a loss of the service is detected based on the always-on status. Notifying the UE when the loss of the service with the PDN is detected may include paging the UE upon detecting the loss of the service with the PDN.

In an aspect of the disclosure, an apparatus, such as a UE, may register with a RAN, establish a connection with one or more PDNs through the RAN, identify a designated PDN as having an always-on status to a network entity of the RAN. The apparatus may enter into an idle mode, and receive a notification from the network entity when a connection between the designated PDN and the RAN is lost.

The connection between the designated PDN and the RAN is lost while in an idle mode. The notification may be received after a page initiated by the network entity is received. The notification may be received from the network entity while connected to at least one other PDN of the one or more PDNs.

A service provided by the one or more of the PDNs may be designated as having an always-on status. A notification may be received from the network entity when a loss of the service is detected based on the always-on status of the service. The service may be lost while in an idle mode. The notification may be received after a page initiated by the network entity is received.

DETAILED DESCRIPTION

Figure 1:
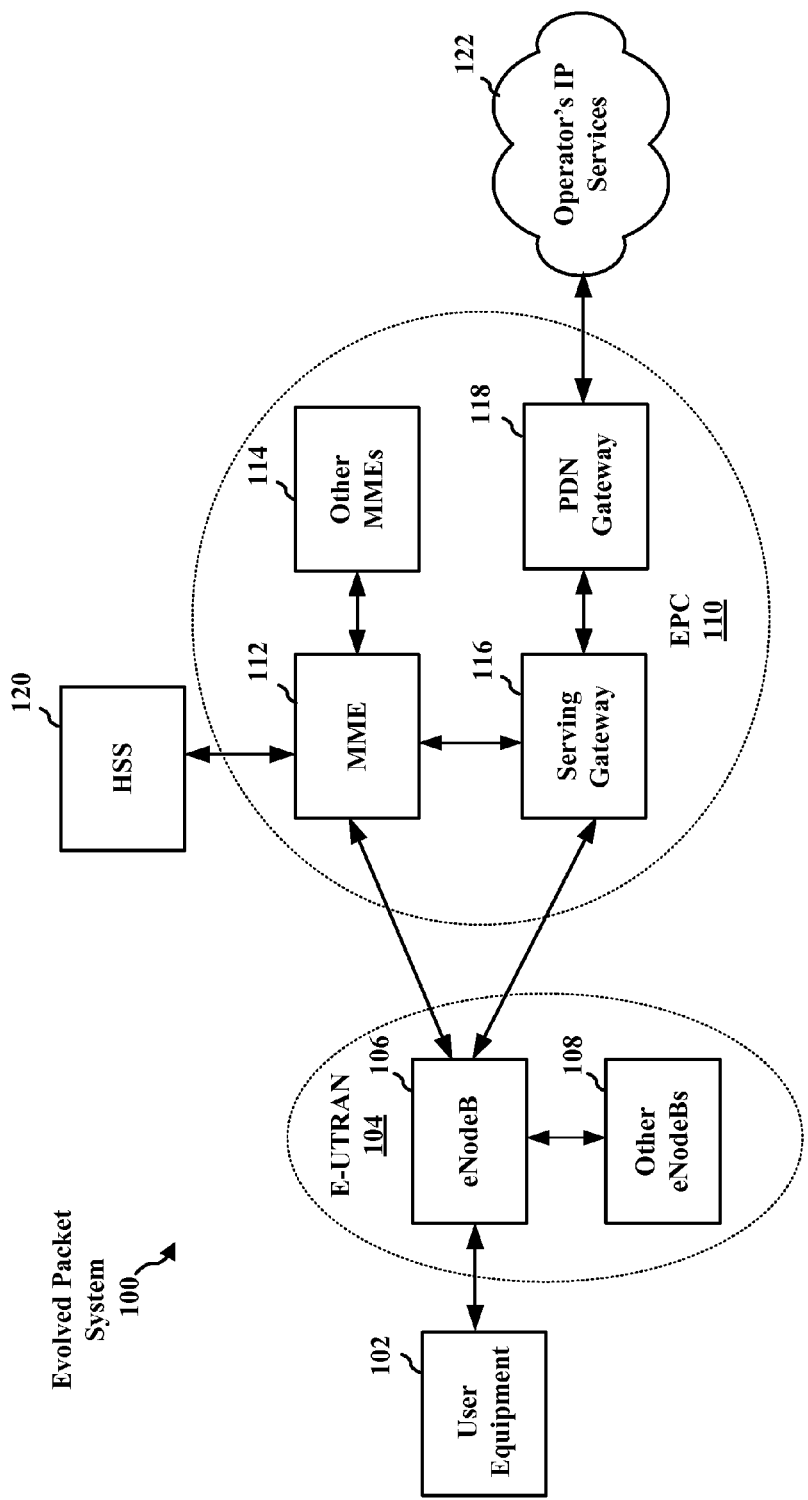
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a PDN Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, an intranet, an IP Multimedia Subsystem (IMS), and a PS Streaming Service (PSS).

Figure 2:
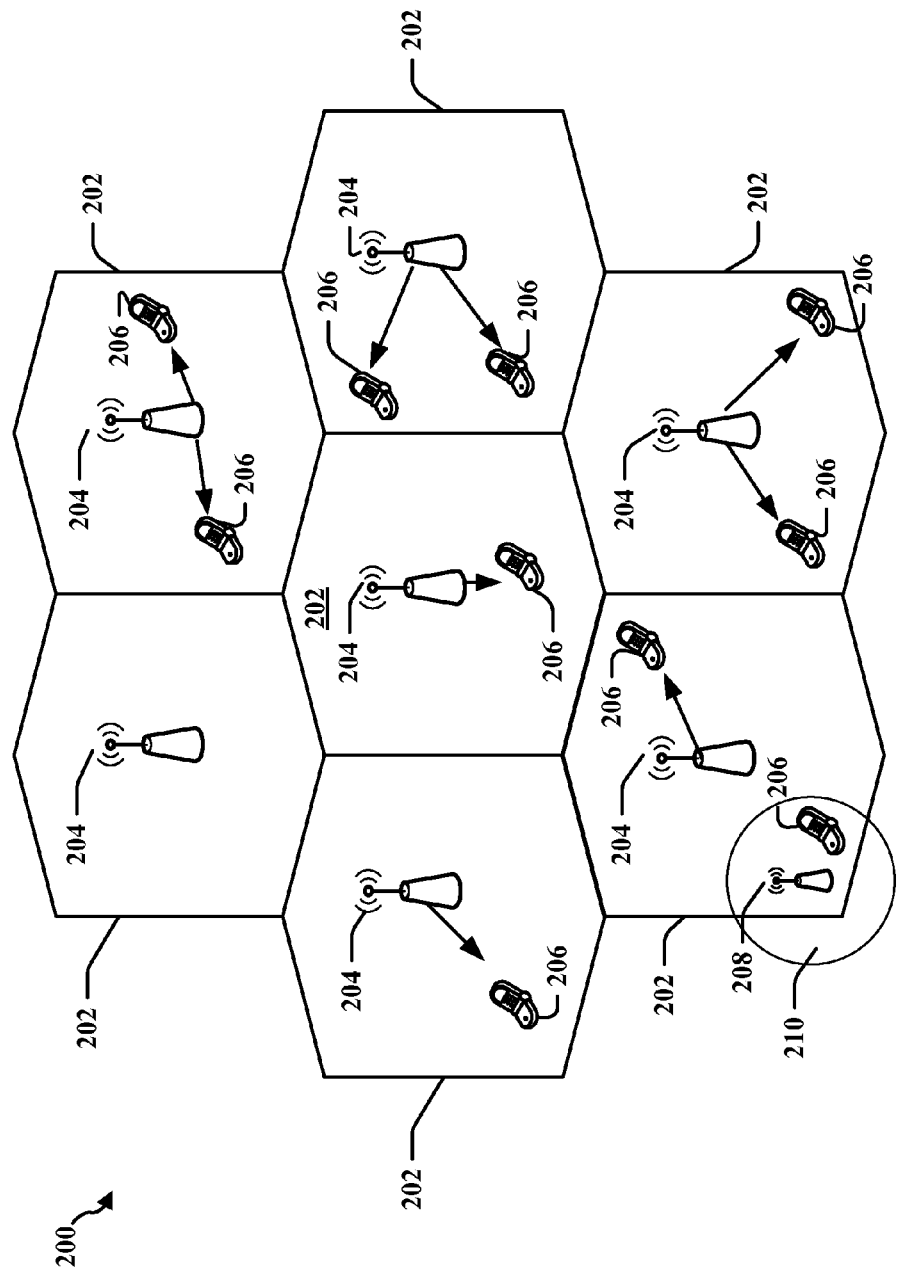
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
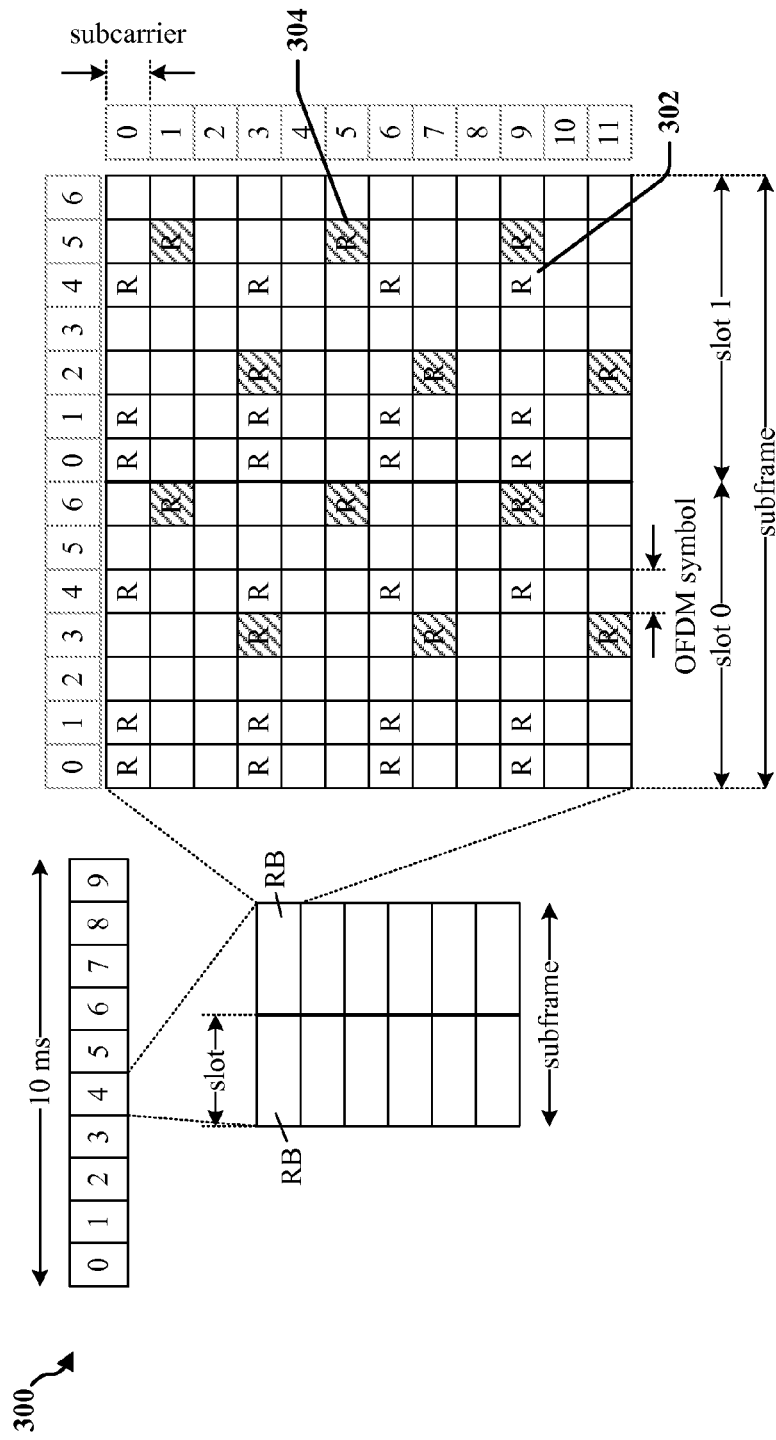
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
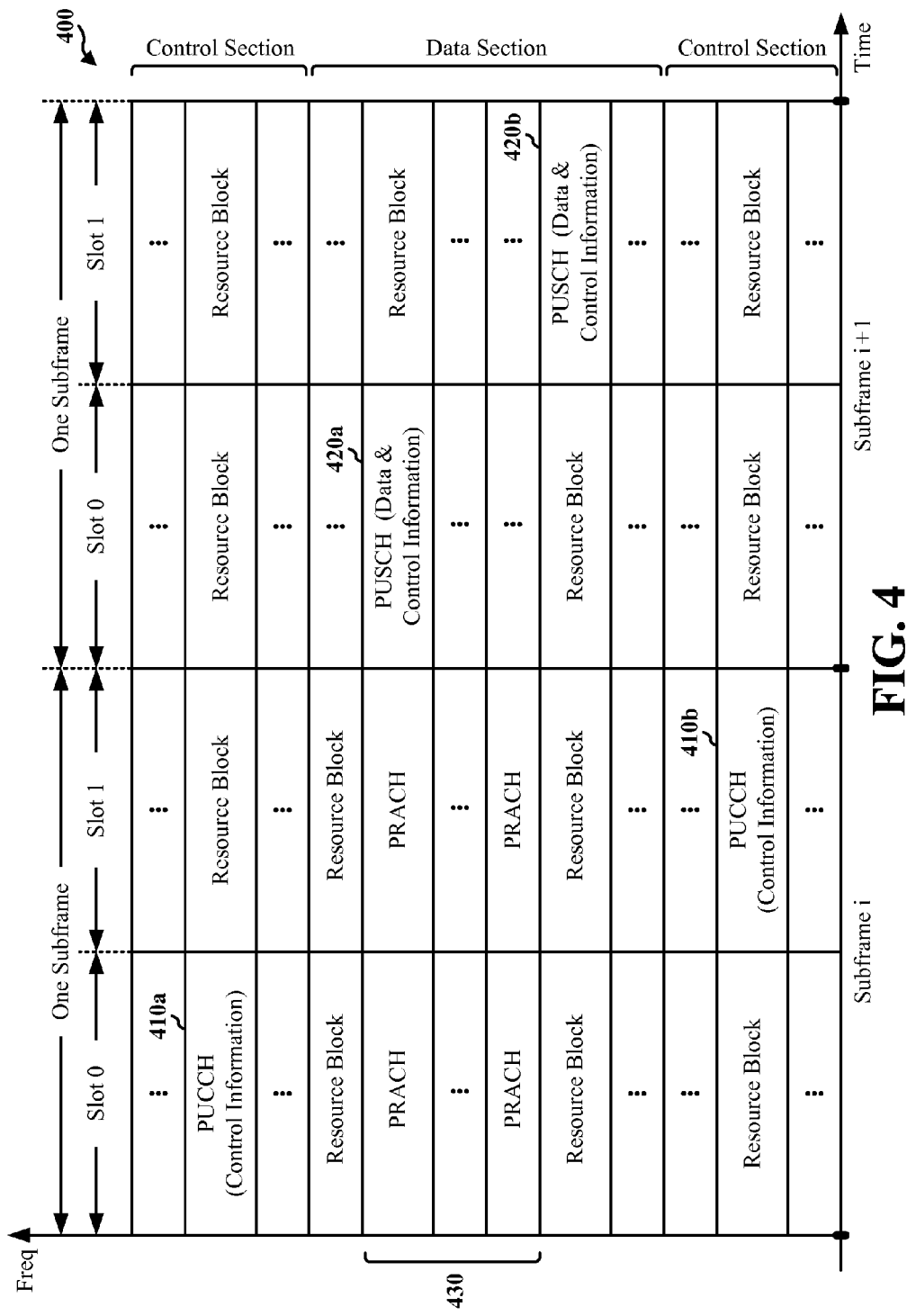
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a sub-frame and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
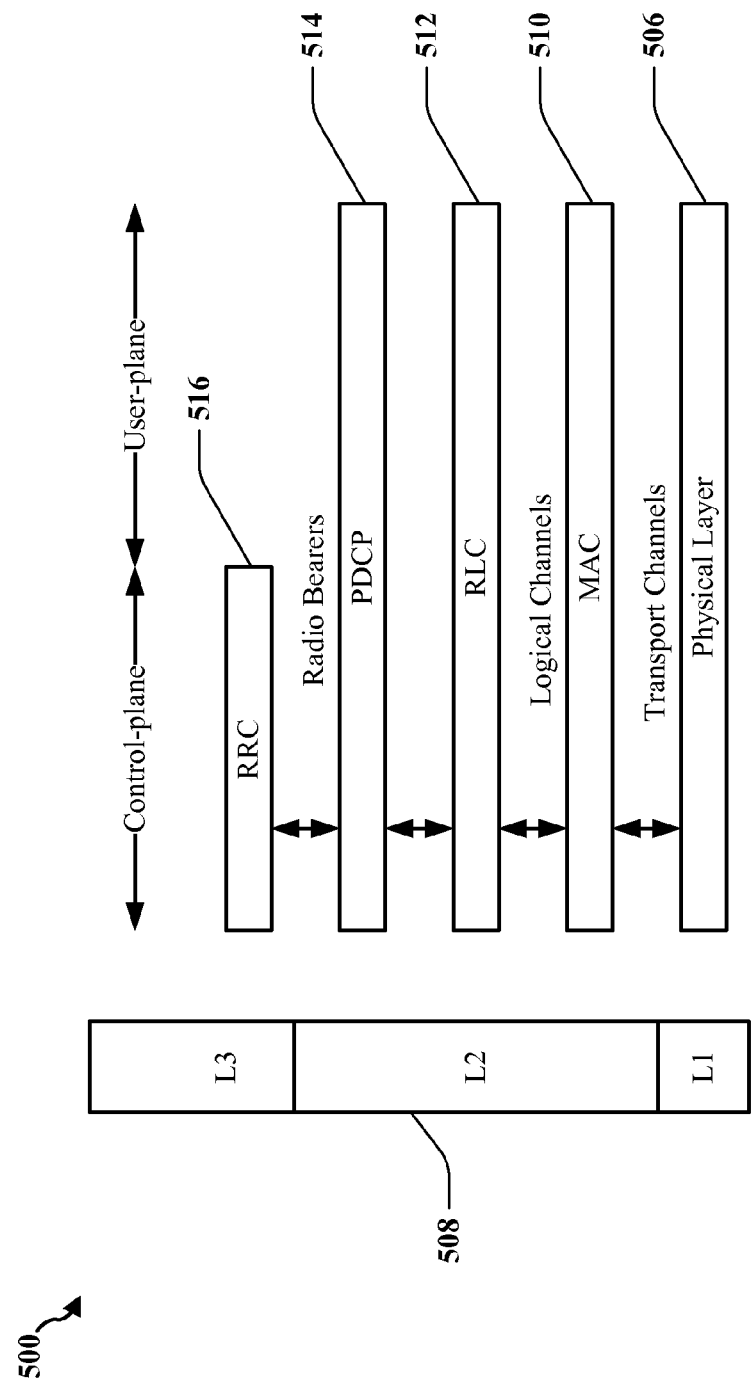
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3.

Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
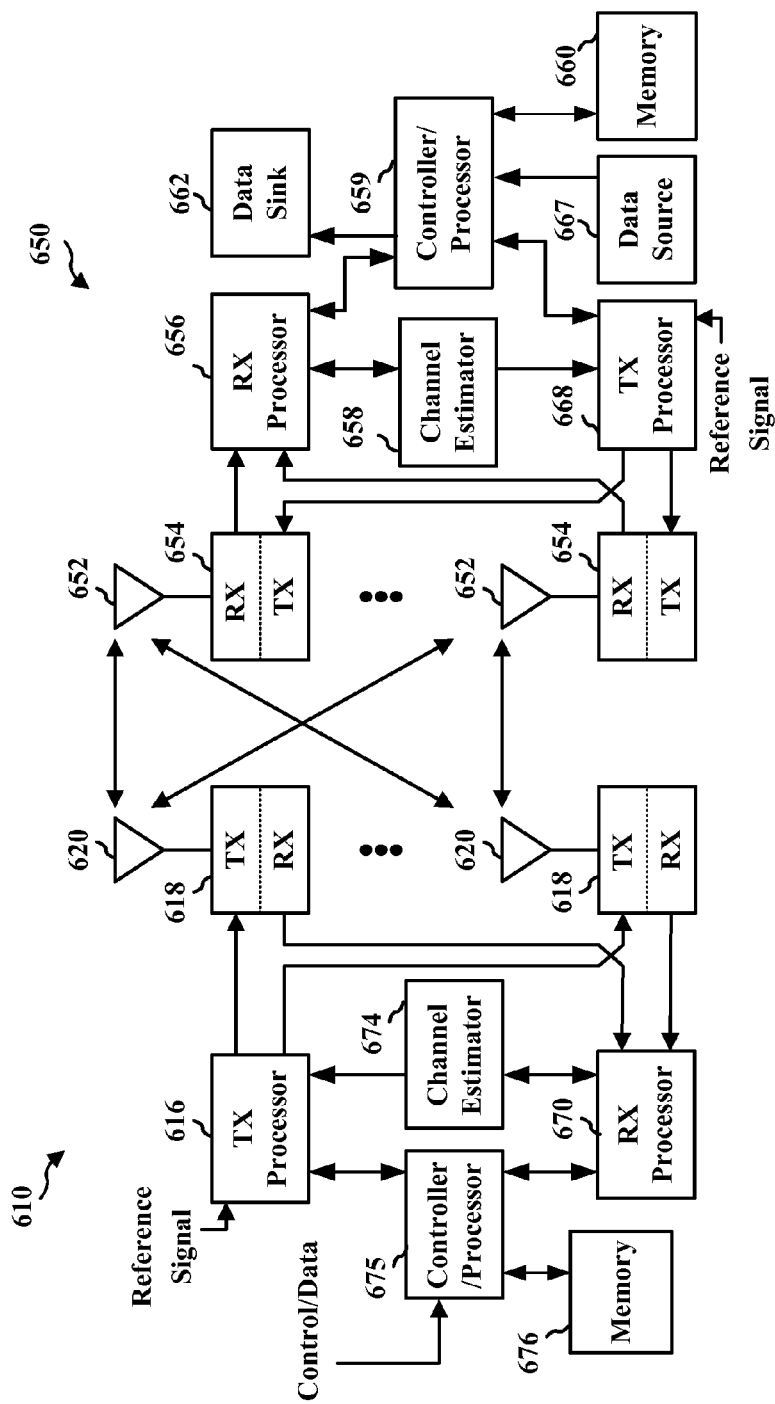
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
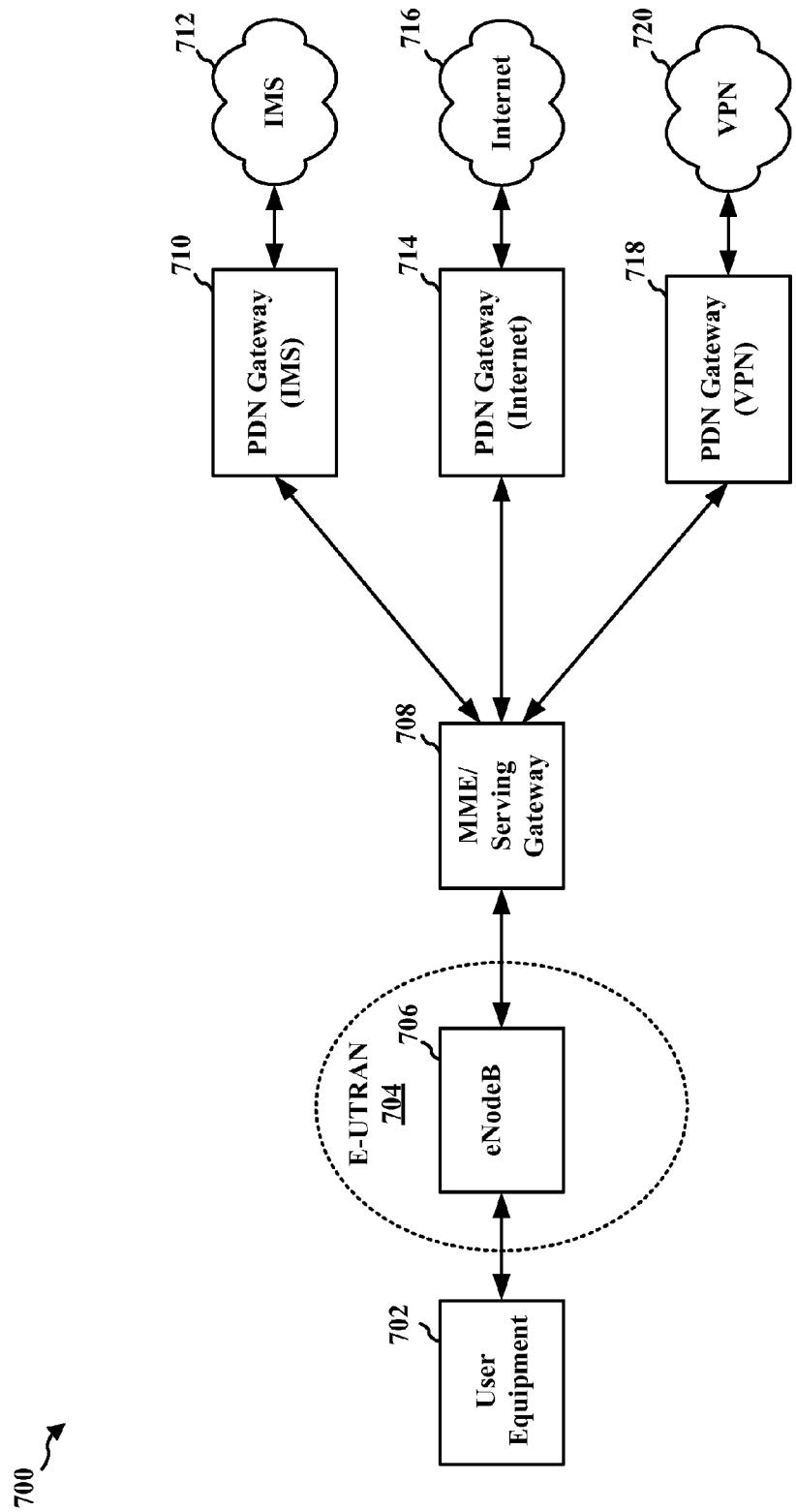
FIG. 7 is a diagram illustrating a wireless access network.

FIG. 7 is a diagram 700 that illustrates a networking environment in which a UE 702 is adapted or configured to establish and maintain connections with a plurality of PDNs 712, 716, and 720. For the purpose of this description, the MME 112 and serving gateway 116 of FIG. 1 are illustrated in combination as a single network entity MME/Serving Gateway 708 and may be referred to interchangeably as MME/Serving Gateway 708, MME 708 and Serving Gateway 708. In the example depicted in FIG. 7, the UE 702 has established and maintains a connection with IMS network 712 through IMS PDN Gateway 710, the Internet 716 through PDN Gateway 714, and VPN network 718 through VPN PDN Gateway 710. Two or more of networks 712, 716, and 720 may be provided as different and distinct services on the same network. For example, one or more applications on UE 702 may connect to the Internet 716 through PDN Gateway 714 and a VPN client on UE 702 may connect with a VPN service 720 through VPN Gateway 718 where the VPN Service 720 may tunnel through the Internet 716 to connect with another VPN server (not shown).

The E-UTRAN 704 may be considered an "always-on" technology in which the UE 702 maintains a continuous connection with at least one PDN gateway 710, 714, and 718, whether the UE 702 is active or idle in a radio access network. In particular, the "always-on" aspect of E-UTRAN 704 implicitly requires that UE 702 is always reachable through the radio access network at an address assigned to the UE 702 when it first registers with a radio access network and connects with a PDN 712, 716, and/or 720. For example, UE 702 may be assigned an IP address when it registers with the PDN Gateway 714 to obtain services from the Internet 716. The "always-on" aspect of E-UTRAN 704 allows the UE 702 to receive mobile terminated IP traffic anytime because the UE 702 is reachable through the PDN Gateway 710, 714, or 718 for which it has been assigned an IP address and perhaps over the Internet as well.

Certain applications may rely on "always-on" behavior for critical applications such as IMS services including voice, SMS, video telephony, presence, etc., to enable the UE 702 to receive mobile terminated sessions and/or calls at anytime. Moreover, certain aspects of "always-on" behavior may be applicable in certain UTRAN/GERAN technologies by, for example, adapting application behavior such that it requests a PDN connection as soon as the UE 702 registers in a UTRAN/GERAN network and thereafter takes the necessary steps to keep-alive or sustain the PDN connection. In one example, "always-on" behavior may be accomplished by ensuring minimal activity of the UE 702 such that inactivity is not detected in the network.

In conventional systems, a UE 702 connected to a PDN 712, 716, and/or 720 may assume that various services available on the PDN 712, 716, and/or 720 will be available when needed and will deliver downlink traffic as it is received at the PDN Gateway 710, 714, and/or 718. For example, if the UE 702 connects to the IMS PDN 712, the UE 702 may assume that it can make and receive IMS calls, including voice, video, and SMS messages, for example. The UE 702 assumes that these services are available as long as the UE 702 is connected to the PDN 712. However, one or more networks 712, 716, and/or 720 may experience problems that require or lead to disconnection of the UE 702 from the PDN 712, 716, and/or 720. In conventional systems, the UE 702 may be notified of the disconnection if the UE 702 is in connected mode. However, the UE 702 may not be notified of the disconnection if the UE 702 is in idle mode, unless the disconnected PDN 712, 716, and/or 720 was the last PDN connection in the UE. Disconnection of the UE 702 from the last PDN 712, 716, and/or 720 may imply deregistration of the UE 702. Notification of the UE 702 may be made by an MME 708, for example.

When the UE 702 is not notified of a PDN 712, 716, and/or 720 disconnection, the UE 702 will determine that disconnection of the PDN 712, 716, and/or 720 when it transitions from idle mode to connected and synchronizes with the network. However, until synchronization, the UE 720 UE may remain unaware of the disconnection and may falsely assume that all subscribed services (from all PDNs 712, 716 and 720) are still available. Therefore, "always-on" disconnection notifications may be provided only when the last PDN connection 712, 716, and/or 720 is disconnected.

In certain embodiments, one or more network entities 706, 708, 710, 714 and/or 718 may be configured or adapted to mandatorily inform a UE 702 when a PDN 712, 716 and 720 is disconnected from the radio access network for any reason. The radio access network, in some cases under guidance from the MME 708, may explicitly page an idle UE 702 to bring it into connected state such that the UE 702 may be informed of disconnection of PDN 712, 716 and 720. Additional signaling may be required and, because an increased signaling load and may not be desirable, the radio access network and/or MME may be informed of one or more PDN connections for which the UE 702 should be informed of PDN disconnection.

In some embodiments, UE 702 may explicitly inform the radio access network and/or MME that the UE 702 wishes to designate the PDN as an "always-on" connection requiring notification of disconnection. The UE 702 may inform the radio access network and/or MME while connecting to the PDN 712, 716 and/or 720, or at a time subsequent to the connection. In one example, the UE 702 may change connection status to "always-on" when subscribing to a new service from the PDN 712, 716 and/or 720. An indication of "always-on" designation may be sent to the radio access network in a PDN Connectivity Request message or in an EPS Bearer Modification message, for example.

Upon notification of the "always-on" nature of a PDN 712, 716 or 720 connection, the MME and/or the radio access network may be configured to take appropriate action if the PDN 712, 716 or 720 is disconnected from the radio access network for any reason. Consequently, if a PDN connection designated as "always-on" by the UE 702 is to be disconnected, the MME and/or the radio access network may be required to inform the UE 702 of the disconnection, even when the UE 702 is in idle mode. If the PDN connection is not designated as an "always-on" connection, the MEM and/or the radio access network may refrain from informing the UE 702, and the UE 702 may determine the change in connection status of a PDN 712, 716 or 720 when the UE 702 is synchronized with the radio access network after the UE 702 transitions to connected mode.

In some embodiments, the MEM and/or the radio access network may delay notification of disconnection of a PDN 712, 716 or 720. The delay may be selected to provide sufficient time for reconnecting the PDN 712, 716 or 720. The delay may be initiated based on a determination that the disconnection is temporary. For example, the PDN 712, 716 or 720 may notify the MEM and/or the radio access network of a planned disconnection, due to a reboot of a server or other network device. In some embodiments, the delay may be initiated as the MEM and/or the radio access network attempts to reestablish the connection to the PDN 712, 716 or 720.

In some embodiments, the MEM and/or the radio access network may be required to inform the UE 702 of a partial loss of service from a PDN 712, 716 or 720. In one example, a PDN 712, 716 or 720 may provide access to a presence server that enables a UE 702 to advertise its presence or the presence of a user of UE 702 to a variety of devices connected in different networks. Loss of a presence server may prevent transmission of a message and/or initiation of a VPN call to the UE 702. However, the PDN 712, 716 or 720 that provided access to the presence server may continue to provide other services for the UE 702, and a notification of disconnection of PDN 712, 716 or 720 would be inappropriate. Accordingly, the UE 702 and/or a service provided by a PDN 712, 716 or 720 may notify the radio access network that a service should be designated as an "always-on" service whereby the radio access network may be required to notify the UE 702 of any determination of loss of the service.

Figure 8:
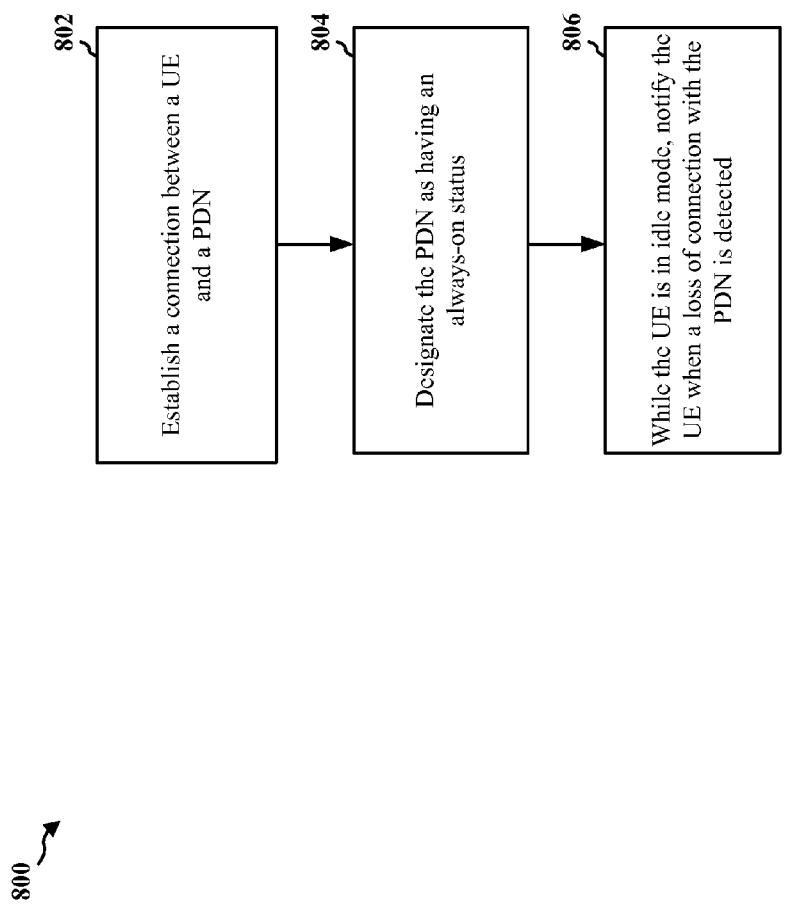
FIG. 8 is a flow chart of a method of wireless communication by a network entity.

FIG. 8 is a flow chart 800 of a method of wireless communication. The method may be performed by a network entity, such as a MME 708. At step 802, the MME 708 establishes a connection between a UE 702 and a PDN 712, 716, or 720. At step 804, the MME 708 designates the PDN 712, 716, or 720 as having an always-on status.

At step 806, the MME 708 notifies the UE 702, while the UE is in an idle mode, when a loss of connection with the PDN 712, 716, 720 is detected based on the always-on status. Notifying the UE 702 when the loss of connection with the PDN 712, 716, 720 is detected may include paging the UE upon detecting the loss of the connection with the PDN when the UE is in an idle mode. Notifying the UE 702 when a loss of connection with the PDN 712, 716, 720 is detected may be performed after a delay of a predefined time interval. The predefined time interval may be calculated based on a time required to attempt reconnection of the PDN 712, 716, 720. The predefined time interval may be determined by the PDN gateway 710, 714, 718 serving the PDN 712, 716, 720. The predefined time interval may be provided by the PDN gateway 710, 714, 718 serving the PDN 712, 716, 720 prior to disconnection of the PDN connection.

In some embodiments, the UE 702 is connected to at least one other PDN 712, 716, 720 when the UE 702 is notified of the loss of the connection. In some embodiments, a service provided by the PDN may be designated as having an always-on status and the UE 702 may be notified when a loss of the service is detected based on the always-on status and regardless of whether the UE 702 is in an active mode or an idle mode. Notifying the UE 702 when the loss of the service with the PDN 712, 716, 720 is detected may include paging the UE 702 upon detecting the loss of the service with the PDN 712, 716, 720 when the UE is in an idle mode.

Figure 9:
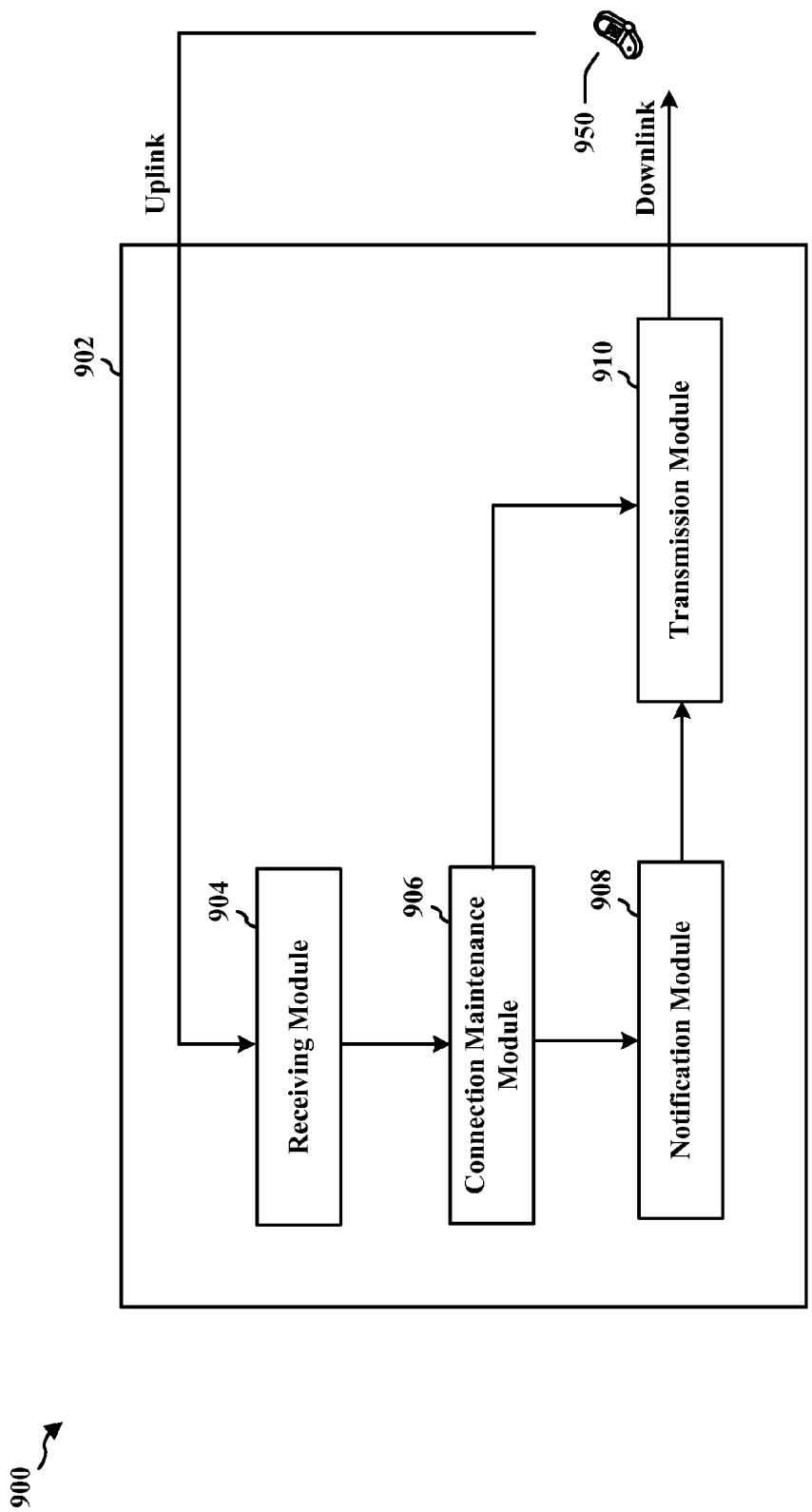
FIG. 9 is a conceptual data flow diagram illustrating the data flow between different modules/means/components in an exemplary network entity apparatus.

FIG. 9 is a conceptual data flow diagram 900 illustrating the data flow between different modules/means/components in an exemplary apparatus 902. The apparatus may be a network entity comprising one or more of an eNB 708 and an MME 708. The apparatus includes a receiving module 904 that receives requests for connection from a UE 950, a connection maintenance module 906 that establishes, maintains and monitors the requested connections, a notification module 908 that prepares a notification of lost connection to be sent to the UE 905, and a transmission module 910 that transmits the notification to the UE 950, while the UE is in an idle mode.

The apparatus may include additional modules that perform each of the steps of the algorithm in the aforementioned flow charts of FIG. 8. As such, each step in the aforementioned flow charts of FIG. 8 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 10:
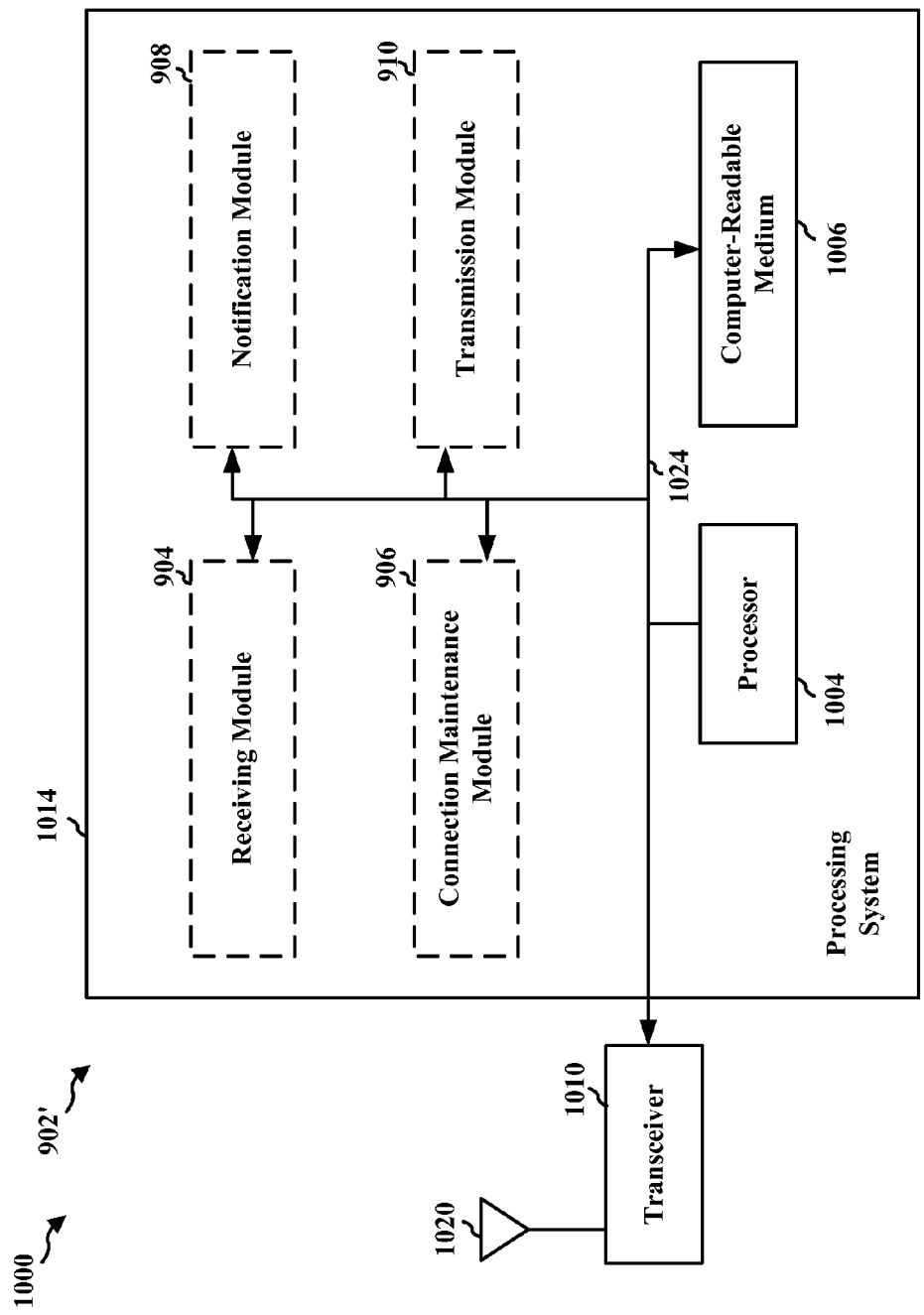
FIG. 10 is a diagram illustrating an example of a hardware implementation for an network entity apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware modules, represented by the processor 1004, the modules 904, 906, 908, 910, and the computer-readable medium 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The processing system 1014 includes a processor 1004 coupled to a computer-readable medium 1006. The processor 1004 is responsible for general processing, including the execution of software stored on the computer-readable medium 1006. The software, when executed by the processor 1004, causes the processing system 1014 to perform the various functions described supra for any particular apparatus. The computer-readable medium 1006 may also be used for storing data that is manipulated by the processor 1004 when executing software. The processing system further includes at least one of the modules 904, 906, 908, and 910. The modules may be software modules running in the processor 1004, resident/stored in the computer readable medium 1006, one or more hardware modules coupled to the processor 1004, or some combination thereof. The processing system 1014 may be a component of the eNB 610 and may include the memory 676 and/or at least one of the TX processor 616, the RX processor 670, and the controller/processor 675.

In one configuration, the apparatus 902/902' for wireless communication includes means for establishing a connection between a UE and a PDN, means for designating the PDN as having an always-on status, and means for notifying the UE, while the UE is in an idle mode, when a loss of connection with the PDN is detected based on the always-on status.

The aforementioned means may be one or more of the aforementioned modules of the apparatus 902 and/or the processing system 1014 of the apparatus 902' configured to perform the functions recited by the aforementioned means. As described supra, the processing system 1014 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

Figure 11:
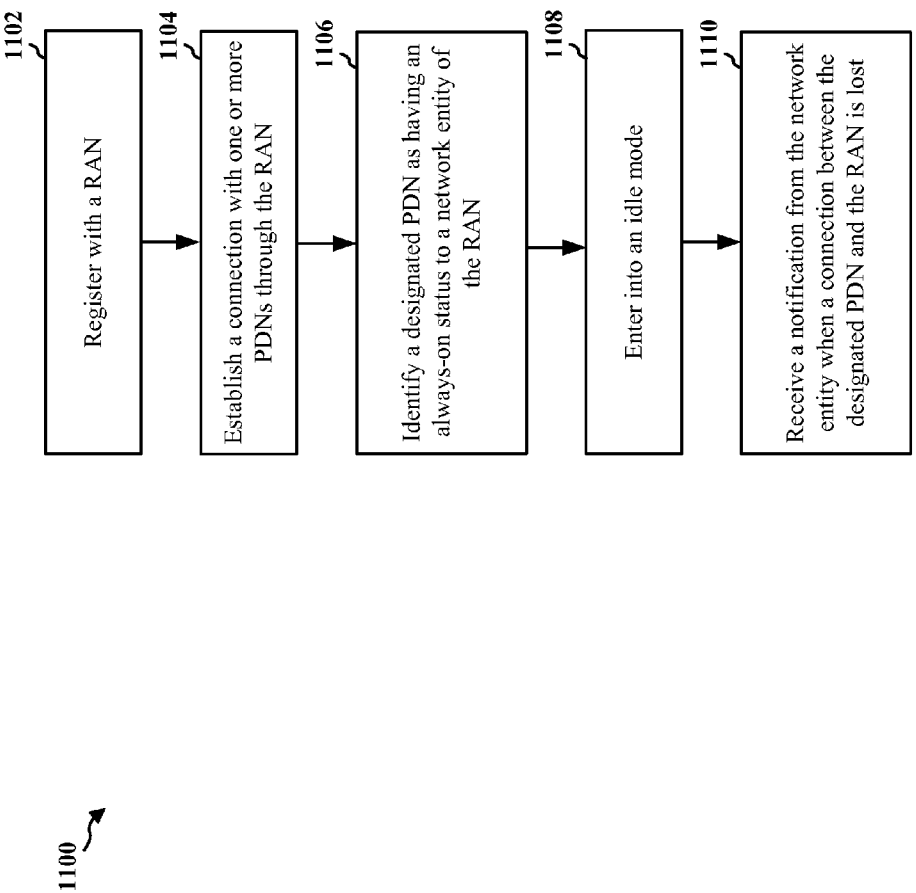
FIG. 11 is a flow chart of a method of wireless communication by a user equipment (UE).

FIG. 11 is a flow chart 1100 of a method of wireless communication. The method may be performed by a UE. At step 1102, the UE 702 registers with a radio access network (RAN), through a network entity, such as a MME 708. At step 1104, the UE establishes a connection with one or more packet data networks (PDNs) 712, 716, 720 through the RAN. At step 1106, the UE 702 identifies a designated PDN 712, 716, 720 as having an always-on status to a network entity 708 of the RAN. Optionally, at step 1108, the UE may designate a service provided by the one or more PDNs 712, 716, 720 as having an always-on status.

At step 1108, the UE 702 enters into an idle mode. At step 1110, the UE 702 receives a notification from the network entity 708 when a connection between the designated PDN 712, 716, 720 and the RAN is lost. The connection between the designated PDN 712, 716, 720 and the RAN may be lost while the UE 702 is in the idle mode. In this case, the notification is received from the network entity 708 after a page initiated by the network entity is received by the UE 702. The notification may be received from the network entity 708 while the UE 702 is connected to at least one other PDN of the one or more PDNs 712, 716, 720.

When a service is designated as always-on, the notification is received from the network entity 708 when a loss of the service is detected based on the always-on status of the service. The service may be lost while the UE 702 is in the idle mode, in which case the notification is received from the network entity 708 after a page initiated by the network entity is received by the UE 702.

Figure 12:
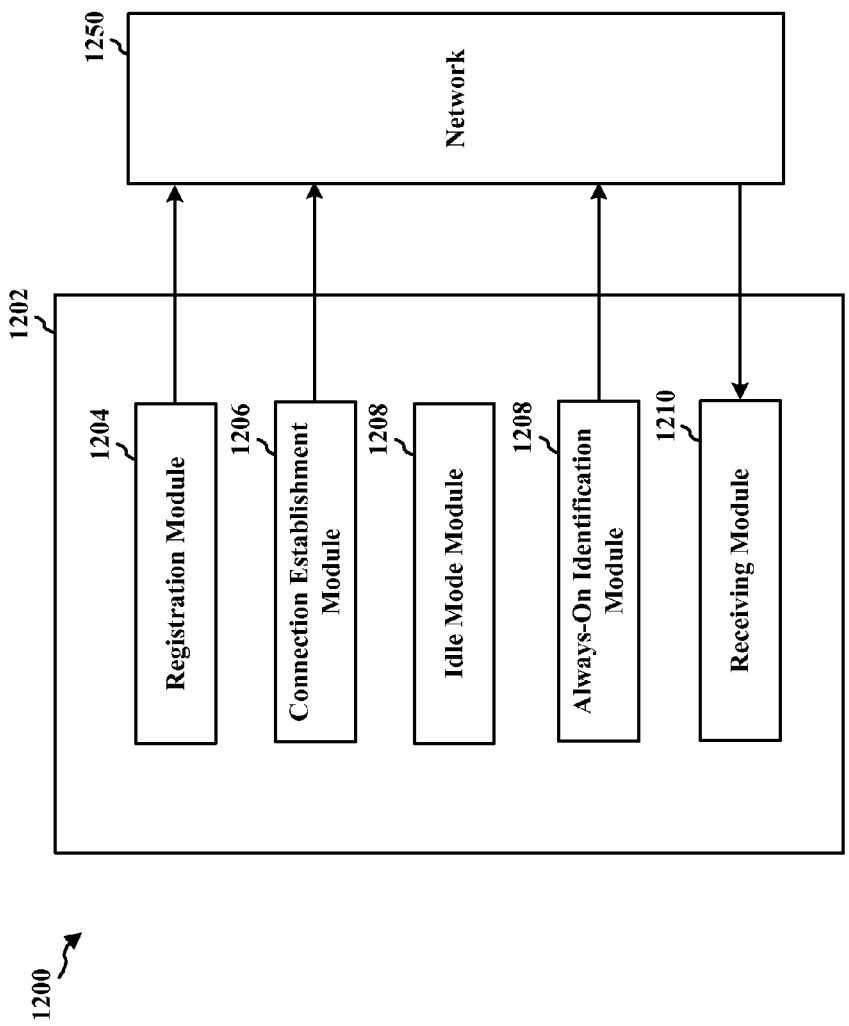
FIG. 12 is a conceptual data flow diagram illustrating the data flow between different modules/means/components in an exemplary UE.

FIG. 12 is a conceptual data flow diagram 1200 illustrating the data flow between different modules/means/components in an exemplary apparatus 1202. The apparatus may be a UE. The apparatus 1202 includes a registration module 1204 that registers the UE with a RAN, and a connection establishment module 1206 that establishes a connection with one or more PDNs through the RAN. Interaction with the RAN takes place through a network entity 1250. The apparatus 1202 also includes an idle mode module 1208 that controls entry of the UE into the idle mode, an always-on identification module 1210 that identifies a designated PDN as having an always-on status to a network entity 1250 of the RAN, and a receiving module 1212 that receives a notification from the network entity 1250 when a connection between the designated PDN and the RAN is lost.

The apparatus may include additional modules that perform each of the steps of the algorithm in the aforementioned flow chart of FIG. 11. As such, each step in the aforementioned flow charts of FIG. 11 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 13:
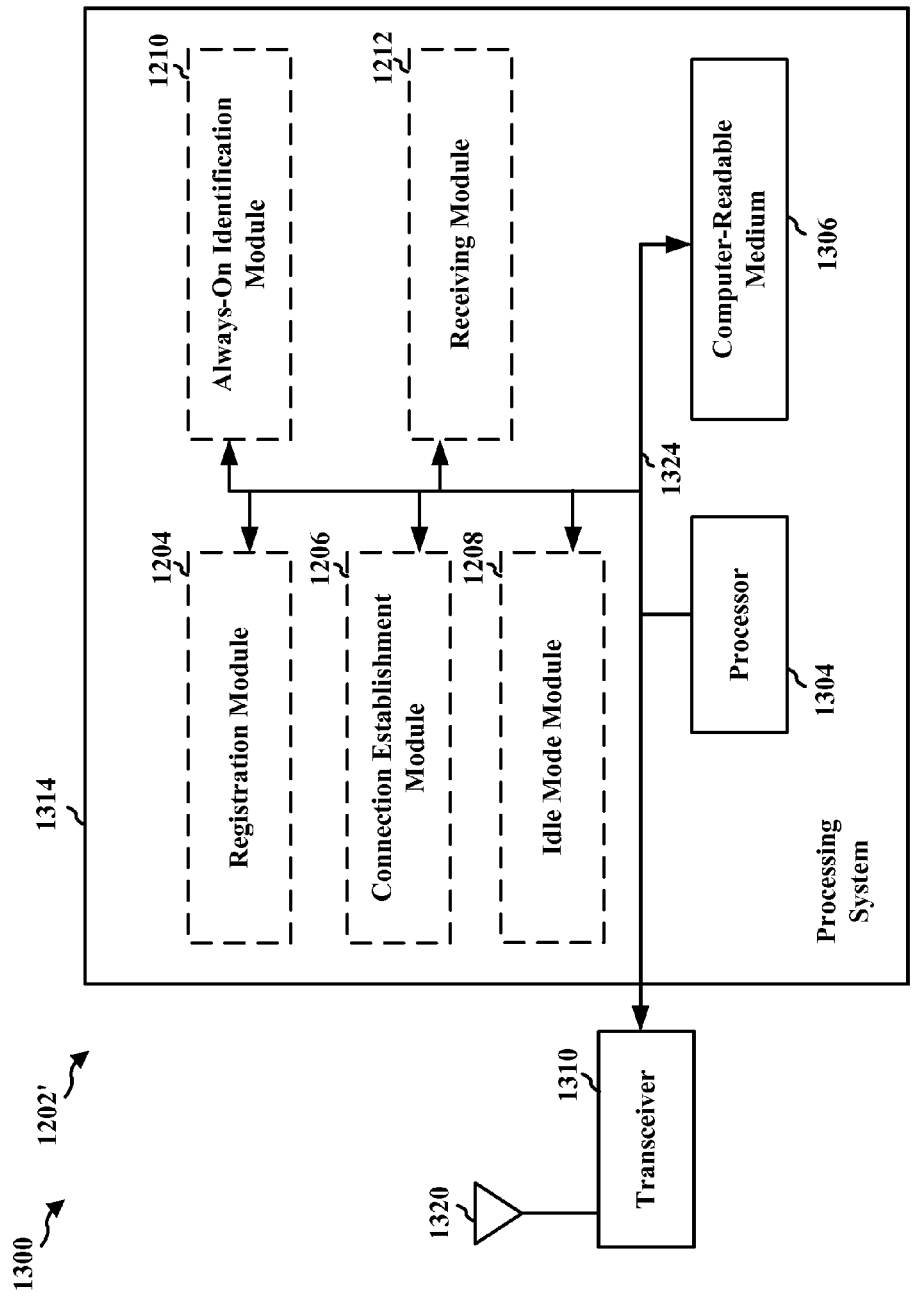
FIG. 13 is a diagram illustrating an example of a hardware implementation for a UE employing a processing system

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware modules, represented by the processor 1304, the modules 1204, 1206, 1208, 1210, 1212 and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system further includes at least one of the modules 1204, 1206, 1208, 1210 and 1212. The modules may be software modules running in the processor 1304, resident/stored in the computer readable medium/memory 1306, one or more hardware modules coupled to the processor 1304, or some combination thereof. The processing system 1314 may be a component of the UE 650 and may include the memory 660 and/or at least one of the TX processor 668, the RX processor 656, and the controller/processor 659.

In one configuration, the apparatus 1202/1202' for wireless communication includes means for registering with a RAN, means for establishing a connection with one or more PDNs through the RAN, means for entering into an idle mode, means for identifying a designated PDN as having an always-on status to a network entity of the RAN, means for receiving a notification from the network entity when a connection between the designated PDN and the RAN is lost, and means for designating a service provided by the one or more PDNs as having an always-on status.

The aforementioned means may be one or more of the aforementioned modules of the apparatus 1202 and/or the processing system 1314 of the apparatus 1202' configured to perform the functions recited by the aforementioned means. As described supra, the processing system 1314 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication of a network entity, comprising:
   establishing a connection between a user equipment (UE) and a packet data network (PDN);
   designating the PDN as having an always-on status; and
   while the UE is in an idle mode, notifying the UE when a loss of connection with the PDN is detected based on the always-on status.

2. The method of claim 1, wherein designating the PDN as having an always-on status comprises receiving information indicating that the UE has signaled to a gateway serving the PDN that the connection between the UE and the PDN is designated as always on.

3. The method of claim 1, wherein notifying the UE when the loss of connection with the PDN is detected comprises paging the UE upon detecting loss of the connection with the PDN.

4. The method of claim 1, wherein notifying the UE when a loss of connection with the PDN is detected comprises waiting for a predefined time interval before notifying the UE of loss of the connection.

5. The method of claim 4, wherein the predefined time interval is calculated based on a time required to attempt reconnection of the PDN.

6. The method of claim 4, wherein the predefined time interval is determined by a gateway serving the PDN.

7. The method of claim 6, wherein the predefined time interval is provided by the gateway serving the PDN prior to disconnection of the PDN connection.

8. The method of claim 1, further comprising:
   designating a service provided by the PDN as having an always-on status; and
   notifying the UE when a loss of the service is detected based on the always-on status.

9. The method of claim 8, wherein notifying the UE when the loss of the service with the PDN is detected includes paging the UE upon detecting the loss of the service with the PDN.

10. An apparatus for wireless communication, comprising:
    means for establishing a connection between a user equipment (UE) and a packet data network (PDN);
    means for designating the PDN as having an always-on status; and
    means for notifying the UE, while the US is in an idle mode, when a loss of connection with the PDN is detected based on the always-on status.

11. The apparatus of claim 10, wherein the means for designating the PDN as having an always-on status is configured to receive information indicating that the UE has signaled to a gateway serving the PDN that the connection between the UE and the PDN is designated as always on.

12. The apparatus of claim 10, wherein the means for notifying the UE when the loss of connection with the PDN is detected is configured to page the UE upon detecting loss of the connection with the PDN when the UE is in an idle mode.

13. The apparatus of claim 10, wherein the means for notifying the UE when a loss of connection with the PDN is detected is configured to wait for a predefined time interval before notifying the UE of loss of the connection.

14. The apparatus of claim 13, wherein the predefined time interval is calculated based on a time required to attempt reconnection of the PDN.

15. The apparatus of claim 13, wherein the predefined time interval is determined by a gateway serving the PDN.

16. The apparatus of claim 15, wherein the predefined time interval is provided by the gateway serving the PDN prior to disconnection of the PDN connection.

17. The apparatus of claim 10, further comprising:
    means for designating a service provided by the PDN as having an always-on status; and
    means for notifying the UE when a loss of the service is detected based on the always-on status.

18. The apparatus of claim 17, wherein the means for notifying the UE when the loss of the service with the PDN is detected is configured to page the UE upon detecting the loss of the service with the PDN.

19. An apparatus for wireless communication, comprising:
    a memory; and
    at least one processor coupled to the memory and configured to:
      establish a connection between a user equipment (UE) and a packet data network (PDN);
      designate the PDN as having an always-on status; and
      notify the UE, while the UE is in an idle mode, when a loss of connection with the PDN is detected based on the always-on status.

20. A non-transitory computer-readable medium having stored thereon computer executable instructions for wireless communication, the instructions comprising:
    establishing a connection between a user equipment (UE) and a packet data network (PDN);
    designating the PDN as having an always-on status; and
    notifying the UE, while the UE is in an idle mode, when a loss of connection with the PDN is detected based on the always-on status and regardless of whether the UE is in an active mode or an idle mode.

21. A method of wireless communication of a user equipment (UE), comprising:

registering with a radio access network (RAN);
establishing a connection with one or more packet data networks (PDNs) through the RAN, wherein a designated PDN has an always-on status;
entering into an idle mode; and
receiving a notification from the network entity when a connection between the designated PDN and the RAN is lost.

22. The method of claim 21, wherein the connection between the designated PDN and the RAN is lost while in the idle mode, and the notification is received from the network entity after a page initiated by the network entity is received by the UE.

23. The method of claim 22, wherein the notification is received from the network entity while the UE is connected to at least one other PDN of the one or more PDNs.

24. The method of claim 21, further comprising designating a service provided by the one or more PDNs as having an always-on status, wherein the notification is received from the network entity when a loss of the service is detected based on the always-on status of the service.

25. The method of claim 24, wherein the service is lost while in the idle mode, and the notification is received from the network entity after a page initiated by the network entity is received by the UE.

26. An apparatus for wireless communication, comprising:
means for registering with a radio access network (RAN);
means for establishing a connection with one or more packet data networks (PDNs) through the RAN;
means for entering into an idle mode;
means for identifying a designated PDN as having an always-on status to a network entity of the RAN; and
means for receiving a notification from the network entity when a connection between the designated PDN and the RAN is lost.

27. The apparatus of claim 26, wherein the connection between the designated PDN and the RAN is lost while in the idle mode, and the notification is received from the network entity after a page initiated by the network entity is received by the UE.

28. The apparatus of claim 27, wherein the notification is received from the network entity while the apparatus is connected to at least one other PDN of the one or more PDNs.

29. The apparatus of claim 26, further comprising means for designating a service provided by the one or more PDNs as having an always-on status, wherein the notification is received from the network entity when a loss of the service is detected based on the always-on status of the service.

30. The apparatus of claim 29, wherein the service is lost while in the idle mode, and the notification is received from the network entity after a page initiated by the network entity is received by the UE.

31. An apparatus for wireless communication, comprising:
a memory; and
at least one processor coupled to the memory and configured to:
register with a radio access network (RAN);
establish a connection with one or more packet data networks (PDNs) through the RAN;
enter into an idle mode;
identify a designated PDN as having an always-on status to a network entity of the RAN; and
receiving a notification from the network entity when a connection between the designated PDN and the RAN is lost.

32. A non-transitory computer-readable medium having stored thereon computer executable instructions for wireless communication, the instructions comprising:
registering with a radio access network (RAN);
establishing a connection with one or more packet data networks (PDNs) through the RAN;
entering into an idle mode;
identifying a designated PDN as having an always-on status to a network entity of the RAN;
receiving a notification from the network entity when a connection between the designated PDN and the RAN is lost.

33. The method of claim 1 comprising:
notifying the UE when a loss of connection with an IP Multimedia Subsystem (IMS) PDN is detected based on the always-on status.

* * * * *